(12) United States Patent
Abe

(10) Patent No.: US 7,957,564 B2
(45) Date of Patent: Jun. 7, 2011

(54) AUTHENTICATION APPARATUS, AUTHENTICATION METHOD AND PROGRAM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 908 days.

(21) Appl. No.: 11/719,241

(22) PCT Filed: Oct. 27, 2005

(86) PCT No.: PCT/JP2005/020165
§ 371 (c)(1),
(2), (4) Date: May 14, 2007

(87) PCT Pub. No.: WO2006/054445
PCT Pub. Date: May 26, 2006

(65) Prior Publication Data
US 2009/0080718 A1  Mar. 26, 2009

(30) Foreign Application Priority Data
Nov. 19, 2004  (JP) .................................. 2004-336500

(51) Int. Cl.
*G06K 9/00* (2006.01)
(52) U.S. Cl. ........ 382/115; 382/116; 382/124; 382/125; 382/128; 382/134
(58) Field of Classification Search .................. 382/115, 382/116, 124, 125, 128, 134
See application file for complete search history.

(56) References Cited

U.S. PATENT DOCUMENTS
6,233,348 B1   5/2001   Fujii et al.

FOREIGN PATENT DOCUMENTS

| | | |
|---|---|---|
| EP | 1197912 | 4/2002 |
| EP | 1376465 | 1/2004 |
| JP | 63-138477 | 6/1988 |
| JP | 64-076368 | 3/1989 |
| JP | 07-028939 | 1/1995 |
| JP | 11-195119 | 7/1999 |
| JP | 2002-190031 | 7/2002 |
| JP | 2004-178606 | 6/2004 |
| WO | 99/51138 | 10/1999 |
| WO | WO9951138 | 10/1999 |

OTHER PUBLICATIONS

European Search Report corresponding to European Serial No. 09014303 dated Jan. 22, 2010.
Bullitt, E. et al., "Measuring Tortuosity of the Intracerebral Vasculature from MR Images", IEEE Transactions on Medical Imaging, vol. 22, No. 9, Sep. 2003, pp. 1163-1171.

(Continued)

Primary Examiner — Bhavesh M Mehta
Assistant Examiner — Mike Rahmjoo
(74) Attorney, Agent, or Firm — SNR Denton US LLP

(57) ABSTRACT

An authentication apparatus is provided to improve efficiency in the use of memory while maintaining the accuracy of authentication.
The authentication apparatus includes: extraction means that extracts a plurality of points on an authentication target from an image obtained by shooting the authentication target unique to a living body; connection means that connects the points extracted by the extraction means; storage means that stores information indicating a connection state of the points being connected by the connection means and information indicating the points as authentication information; and reproduction means that reproduces, based on the authentication information in the storage means, the authentication target to be compared with the other.

12 Claims, 9 Drawing Sheets

OTHER PUBLICATIONS

Cross, J. M. et al., Thermographic Imaging of the Subcutaneous Vascular Network of the Back of the Hand for Biometric Identification:, Security Technology 1995, Proceedings. Institute of Electrical ad Electronics Engineers 29th Annual 1995 International Carnahan Conference on Sanderstead, UK, Oct. 18, 1995, pp. 20-35.

Sen, A. et al., "Improved Coronary Vessel Tracking Using Non-Linear Filter Enhanced X-ray Angiograms", Proceedings of the 19th Annual International Conference of the IEEE Engineering in Medicine and Biology Society. Magnificent Milestones and Emerging Opportunities in Medical Engineering, vol. 2, 1997, pp. 573-576.

International Search Report dated Dec. 20, 2005.

Cross J.M., et al., Thermographic imaging of the subcutaneous vascular network of the back for the hand for biometric identifications, Security Technology 1995, Institute of Electrical and Electronics Engineers 29th Annual International Carnahan Conference, 1995, p. 20-35, ISBN: 0-7803-2627-X.

Sen A., et al, Improved coronary vessel tracking using non-linear filter enhanced X-ray angiograms, Proceedings of the 19th Annual International Conference of the IEEE in Medicine and Biology Society, Magnificent Milestones and Emerging Opportunities in Medical Engineering, 1997, p. 573-6, ISBN: 0-7803-4262-3.

Bullitt E., et al., Measuring tortuosity of the intracerebral vasculature from MRA images, IEEE Transactions on Medical Imaging, 2003, p. 1163-71, vol. 22(9).

European Search Report issued on Mar. 12, 2008 in connection with European Patent Application No. 05800163.7.

Japanese Office Action issued on Aug. 20, 2009 in connection with JP Application No. 2004-336500.

Japanese Office Action issued on Oct. 28, 2010 in connection with counterpart Japanese paten application No. 2009-175152.

AUTHENTICATION APPARATUS, AUTHENTICATION METHOD AND PROGRAM

TECHNICAL FIELD

The present invention relates to an authentication apparatus, authentication method and program, and is preferably applied to biometric authentication, for example.

BACKGROUND ART

There have been many kinds of authentication devices whose biometric measurements are taken from the fingerprints of living individuals. In recent years, blood vessels of living individuals are regarded as one of the targets for biometric authentication.

This kind of authentication devices takes an image of blood vessels by using near-infrared rays: The main absorbers of near-infrared rays in the blood vessels are deoxy-hemoglobin (venous blood) and oxy-hemoglobin (arterial blood). The authentication device then registers the resultant blood vessel image in a memory as data to be compared with the other, or checks it against data or blood vessel images registered in the memory (see Patent Document 1, for example).
Patent Document 1 Japanese Patent Publication No. 2004-178606.

However, since the above authentication device just stores the resultant blood vessel image in the memory without processing it, there is a problem that a large amount of space in the memory is occupied by one-person blood vessel image.

One way to solve the problem is to find out the bifurcation points of the vessels from the blood vessel images to be stored in the memory as a blood vessel pattern. This method, however, reduces the accuracy of authentication because it only checks up the bifurcation points.

DISCLOSURE OF THE INVENTION

The present invention has been made in view of the above points and is intended to provide an authentication apparatus, authentication method and program capable of reducing the amount of data to be stored while maintaining the accuracy of authentication.

To solve the above problem, according to the present invention, an authentication apparatus includes: extraction means that extracts a plurality of points on an authentication target from an image obtained by shooting the authentication target unique to a living body; connection means that connects the points extracted by the extraction means such that the points approximate to the authentication target; storage means that stores information indicating a connection state of the points being connected by the connection means and information indicating the points as authentication information; and reproduction means that reproduces, based on the authentication information in the storage means, the authentication target to be compared with the other.

In this manner, the authentication apparatus only stores the points and the connection state of reliable points that approximate to the authentication information in the storage means. When performing authentication, the authentication apparatus reproduces, by the reproduction means, the authentication target to be compared with the other. This improves efficiency in the use of the storage means while maintaining the accuracy of authentication.

Moreover, according to the present invention, an authentication method includes: a first step of extracting a plurality of points on an authentication target from an image obtained by shooting the authentication target unique to a living body; a second step of connecting the points extracted such that the points approximate to the authentication target; a third step of storing information indicating a connection state of the points being connected and information indicating the points in storage means as authentication information; and a fourth step of reproducing, based on the authentication information in the storage means, the authentication target to be compared with the other.

In this manner, the authentication method only stores the points and the connection state of reliable points that approximate to the authentication information in the storage means. When performing authentication, the authentication method reproduces the authentication target to be compared with the other. This improves efficiency in the use of the storage means while maintaining the accuracy of authentication.

Furthermore, according to the present invention, a program causes an apparatus that takes control to execute: a first process of extracting a plurality of points on an authentication target from an image obtained by shooting the authentication target unique to a living body; a second process of connecting the points extracted such that the points approximate to the authentication target; a third process of storing information indicating a connection state of the points being connected and information indicating the points in storage means as authentication information; and a fourth process of reproducing, based on the authentication information in the storage means, the authentication target to be compared with the other.

In this manner, the program only stores the points and the connection state of reliable points that approximate to the authentication information in the storage means. When performing authentication, the program reproduces the authentication target to be compared with the other. This improves efficiency in the use of the storage means while maintaining the accuracy of authentication.

According to the present invention, the authentication apparatus, authentication method and program perform the process of: extracting a plurality of points on an authentication target from an image obtained by shooting the authentication target unique to a living body; connecting the points extracted such that the points approximate to the authentication target; storing information indicating a connection state of the points being connected and information indicating the points in storage means as authentication information; and reproducing, based on the authentication information in the storage means, the authentication target to be compared with the other. In this manner, they only store the points and the connection state of reliable points that approximate to the authentication information in the storage means. When performing authentication, they reproduce the authentication target to be compared with the other. This improves efficiency in the use of the storage means while maintaining the accuracy of authentication.

BEST MODE FOR CARRYING OUT THE INVENTION

An embodiment of the present invention will be described in detail with reference to the accompanying drawings.

(1) Overall Configuration of Authentication Device

Figure 1:
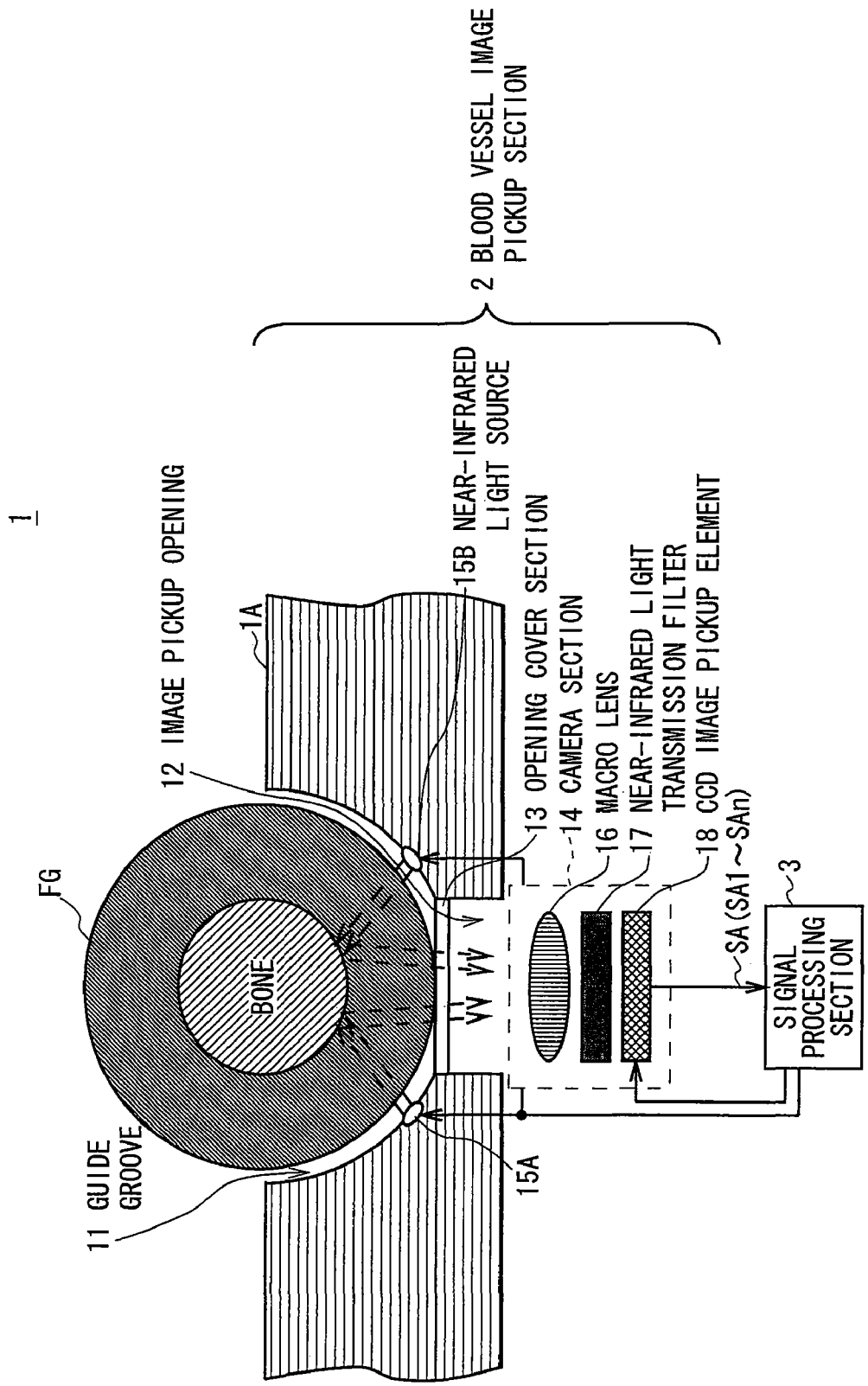
FIG. 1 is a schematic diagram illustrating the overall configuration of an authentication device according to an embodiment of the present invention.

In FIG. 1, the reference numeral 1 denotes an authentication device 1 according to an embodiment of the present invention. The authentication device 1 includes a blood vessel image pickup section 2 and a signal processing section 3 which is connected to the blood vessel image pickup section 2 through a cable.

The blood vessel image pickup section 2 includes a curved guide groove 11 to accommodate a finger FG: The guide groove 11 is formed at a predetermined position of a housing 1A of the authentication device 1. At the bottom of the guide groove 11 is an image pickup opening 12.

Accordingly, in the blood vessel image pickup section 2, when the finger FG is put on the guide groove 11 the pad of the finger FG is on the image pickup opening 12. In addition, the image pickup opening 12 may be adjusted or moved in response to the length of the finger FG whose tip touches the end of the guide groove 11.

Moreover, the image pickup opening 12 has a transparent opening cover section 13 on its surface. Underneath the image pickup opening 12 is a camera section 14 inside the housing 1A.

On the side walls of the guide groove 11 are a pair of near-infrared light sources 15 (15A and 15B) that emits a beam of image-pickup light or near-infrared light that hemoglobin especially absorbs well: The pair of near-infrared light sources 15 are parallel to a shorter direction of the guide groove 11 and are on the opposite sides of the image pickup opening 12. The near-infrared light sources 15 emit near-infrared rays to the sides of the finger pad FG on the guide groove 11.

That reduces the reflection of infrared light from the surface of the finger FG in comparison to light sources that emit near-infrared rays to the bottom of the finger pads FG. After getting into the finger FG through its surface, the near-infrared light is absorbed by hemoglobin in the blood vessels as well as scattering in all directions (other than the blood vessels) inside the finger FG. The camera section 14 detects near-infrared rays, or blood-vessel reflection light reflecting the shape of the blood vessels, from the finger FG through the image pickup opening 12 and the opening cover section 13.

The camera section 14 includes: a macro lens 16; a near-infrared light transmission filter 17 that only particular wavelengths (approximately 900 to 1000 [nm] wavelengths being dependent on both oxy-hemoglobin and deoxy-hemoglobin) of near-infrared light pass through; and a CCD image pickup element 18. The blood-vessel reflection light comes into from the opening cover section 13 and passes through the macro lens 16 and the near-infrared light transmission filter 17 to reach an image pickup surface of the CCD image pickup element 18. Accordingly, the camera section 14 makes up an image of both venous and arterial capillary blood vessels inside the finger FG.

The CCD image pickup element 18, under the control of a signal processing section 3, takes in an image of blood vessels formed on the image pickup surface, and outputs resulting image signals (or blood vessel image signals) SA1, SA2, . . . , and SAn to the signal processing section 3.

Figure 2:
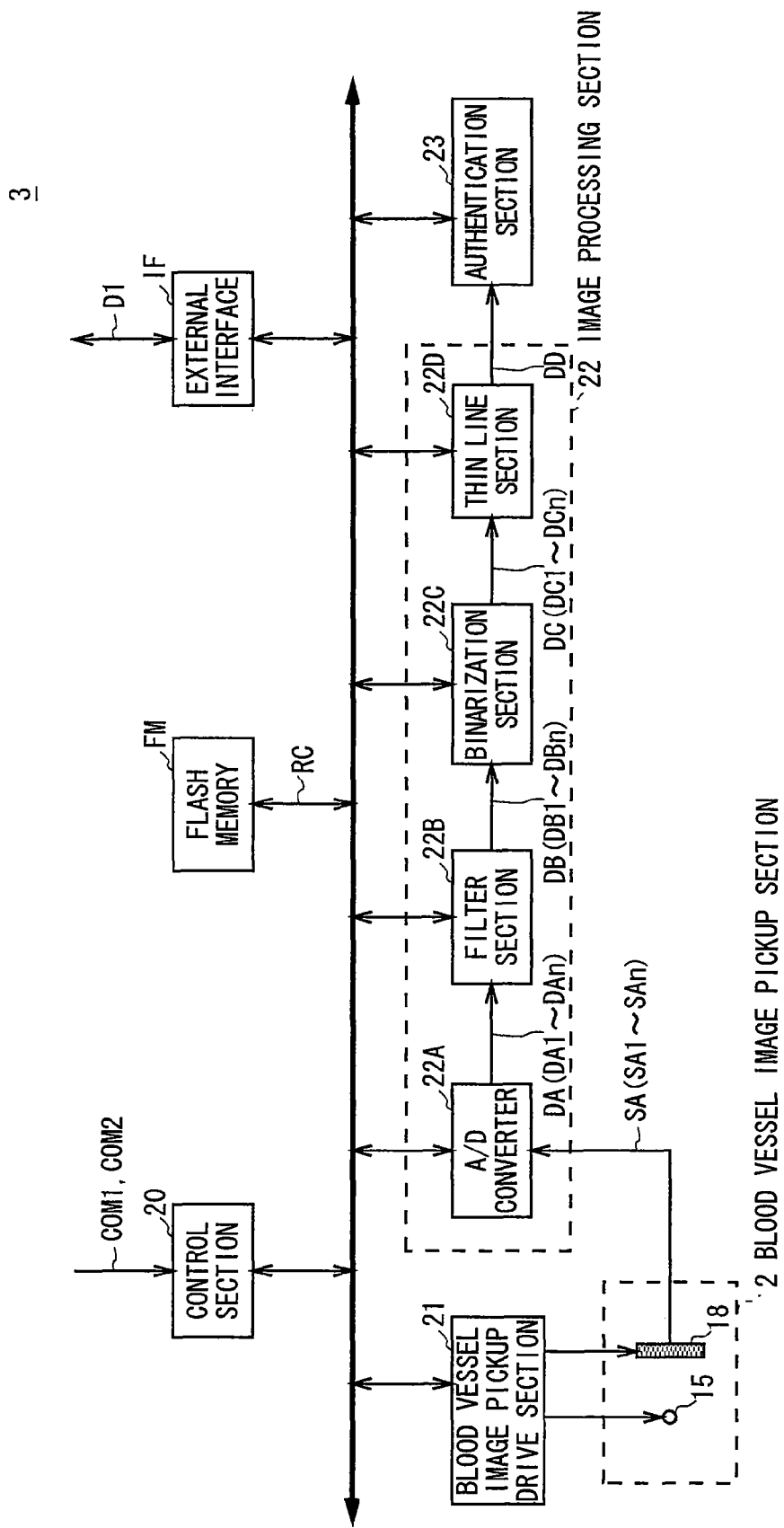
FIG. 2 is a block diagram illustrating the configuration of a signal processing section.

As shown in FIG. 2, the signal processing section 3 includes a control section 20: The control section 20 is connected to a blood vessel image pickup drive section 21, an image processing section 22, an authentication section 23, a flash memory FM and an external interface IF which exchanges data with external devices.

The control section 20 includes: a CPU (Central Processing Unit) that takes overall control of the authentication device 1; a ROM (Read Only Memory) storing programs; and a RAM (Random Access memory) that serves as a work memory for the CPU. When an operation section (not shown) located at a predetermined position of the surface of the housing 1A of the authentication device 1 is operated the following commands are provided to the control section 20: an execution command COM1 for a mode (also referred to as a "blood vessel registration mode") of registering persons' blood vessels or an execution command COM2 for a mode (also referred to as an "authentication mode") of identifying persons.

When the blood vessel registration mode execution command COM1 is offered to the control section 20 from the operation section (not shown) the control section 20 executes a corresponding program in the ROM to run the blood vessel registration mode. The control section 20 therefore controls the blood vessel image pickup drive section 21, the image processing section 22 and the authentication section 23.

In this case, the blood vessel image pickup drive section 21 initiates the blood vessel image pickup section 2 to run the near-infrared light sources 15 and the CCD image pickup element 18 of the camera section 14. Thus the blood vessel image pickup section 2 emits, from the near-infrared light sources 15, near-infrared light to the sides of the person's finger pad FG (FIG. 1) placed at the guide groove 11 (FIG. 1). After traveling inside the finger FG (FIG. 1), the near-infrared light, or the blood-vessel reflection light, reaches the image pickup surface of the CCD image pickup element 18. The blood-vessel reflection light is transformed into the blood vessel image signals SA1, SA2, . . . , and SAn which are then supplied to an A/D (Analog-to-Digital) converter 22A of the image processing section 22.

The A/D converter 22A performs A/D conversion to the blood vessel image signals SA1, SA2, . . . , and SAn, and supplies resulting blood vessel image data DA1, DA2, . . . , DAn to the filter section 22B.

The filter section 22B performs filtering processes, such as noise reduction or edge enhancement, to the blood vessel image data DA1, DA2, ..., DAn, and supplies resultant blood vessel image data DB1, DB2, ..., DBn to the binarization section 22C.

The binarization section 22C binarizes the blood vessel image data DB1, DB2, ..., DBn, and then supplies resultant data (referred to as "binarized blood vessel image data") DC1, DC2, ..., DCn of monochrome blood vessel image (referred to as a "binarized blood vessel image") to a thin line section 22D.

The thin line section 22D for example performs a morphology process to the binarized blood vessel image data DC1, DC2, ..., DCn to make blood vessels on the binarized blood vessel image thin lines.

The thin line section 22D then selects one out of a plurality of binarized blood vessel images where blood vessels are shown as thin blood vessel lines. The thin line section 22D subsequently supplies the selected binarized blood vessel image to the authentication section 23 as binarized blood vessel image data DD.

The authentication section 23 transforms the binarized blood vessel image data DD into a predetermined format of registration authentication information RC, and then supplies the registration authentication information RC to the control section 20.

In this manner, the control section 20 controls the blood vessel image pickup drive section 21, the image processing section 22 and the authentication section 23. As a result, the control section 20 receives the registration authentication information RC from the authentication section 23, and registers the registration authentication information RC in the flash memory FM. The control section 20 then stops controlling the blood vessel image pickup drive section 21, the image processing section 22 and the authentication section 23. This stops the blood vessel image pickup section 2.

In this manner, the control section 20 runs the blood vessel registration mode.

On the other hand, when the authentication mode execution command COM2 is offered to the control section 20 from the operation section (not shown) the control section 20 executes a corresponding program in the ROM to run the authentication mode. The control section 20 therefore controls the blood vessel image pickup drive section 21, the image processing section 22 and the authentication section 23 while reading out the registration authentication information RC from the flash memory FM and supplying it to the authentication section 23.

In a similar way to that of the above blood vessel registration mode, the blood vessel image pickup drive section 21 initiates the blood vessel image pickup section 2. The image processing section 22, in a similar way to that of the above blood vessel registration mode, performs processes to the blood vessel image signals SA (SA1 to SAn) from the blood vessel image pickup section 2, and then supplies the resultant binarized blood vessel image data DD to the authentication section 23.

The authentication section 23 compares the binarized blood vessel image of the binarized blood vessel image data DD with that of the registration authentication information RC that the control section 20 read out from the flash memory FM to check whether both patterns of blood vessel lines match each other.

Based on criteria about how well they match each other, the authentication section 23 determines whether a person, whose finger image was taken by the blood vessel image pickup section 2, is one who has been already registered in the authentication device 1. The authentication section 23 then notifies the control section 20 of the result as determination data D1.

In this manner, the control section 20 controls the blood vessel image pickup drive section 21, the image processing section 22 and the authentication section 23 to receive the determination data D1 from the authentication section 23. The control section 20 then transmits the determination data D1 to external devices through the external interface IF. The control section 20 subsequently stops controlling the blood vessel image pickup drive section 21, the image processing section 22 and the authentication section 23. This stops the blood vessel image pickup section 2.

In this manner, the control section 20 runs the authentication mode.

In this manner, the authentication device 1 performs biometric authentication to identify a person: the authentication device 1 checks unique blood vessels inside living bodies. Therefore it is difficult for a third party to steal the blood vessels from the living bodies or to do spoofing compared to a system just checking up fingerprints on surfaces of living bodies.

(2) Detailed Description of Processes by Authentication Section

The following describes the processes of the above authentication section 23 in detail.

Figure 3:
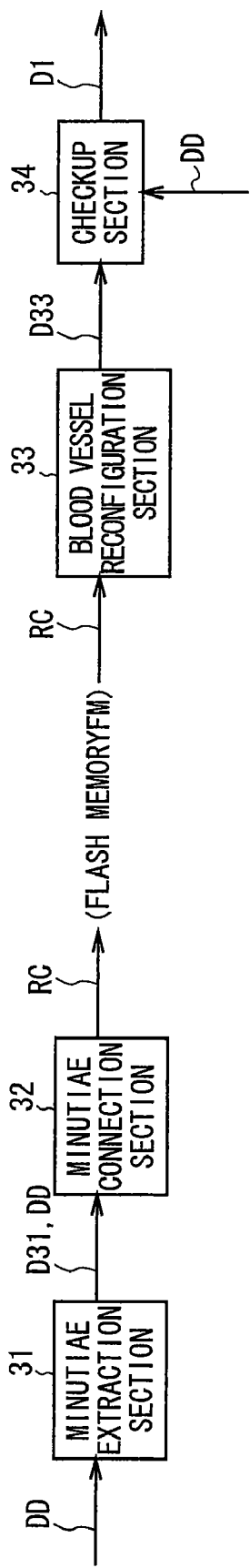
FIG. 3 is a functional block diagram illustrating a process of an authentication section.

As shown in FIG. 3, the authentication process of the authentication section 23 which is controlled by the control section 20 can functionally divide into a minutiae extraction section 31, a minutiae connection section 32, a blood vessel reconfiguration section 33 and a checkup section 34.

When the authentication section 23 at the blood vessel registration mode receives the binarized blood vessel image data DD from the thin line section 22D (FIG. 2), the minutiae extraction section 31 performs a minutiae extraction process to extract minutiae of blood lines from the binarized blood vessel image. The minutiae connection section 32 subsequently connects all the minutiae to form approximate blood vessel lines. The minutiae connection section 32 then registers the following data in the flash memory FM as registration authentication information RC: data (referred to as "connection state data") depicting the connection state of the minutiae; and data (referred to as "minutiae position data") depicting positions of the minutiae.

On the other hand, after the control section 20 (FIG. 2) reads out the registration authentication information RC, or the connection state data and minutia position data, from the flash memory FM, the authentication section 23 at the authentication mode controls the blood vessel reconfiguration section 33 to reproduce the binarized blood vessel image based on the connection state data and the minutia position data. The checkup section 34 then compares the reproduced binarized blood vessel image with that of the binarized blood vessel image data DD supplied from the thin line section 22D (FIG. 2) to identify a person based on criteria about how well they match each other.

The following details the minutiae extraction process of the minutiae extraction section 31, the minutiae connection process of the minutiae connection section 32, the image reconfiguration process of the blood vessel reconfiguration section 33 and the checkup process of the checkup section 34.

(2-1) Minutiae Extraction Process

Figure 4:
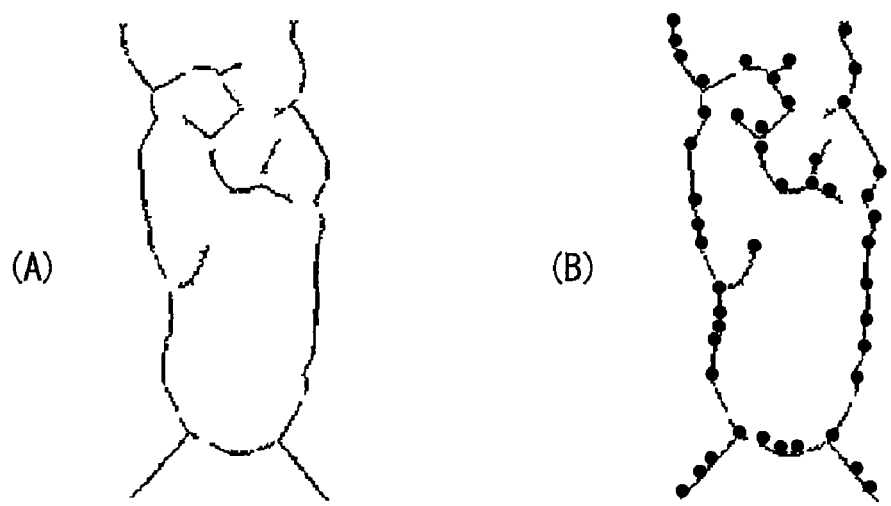
FIG. 4 is a schematic diagram illustrating before and after extraction of minutiae.

As shown in FIG. 4, the minutiae extraction section 31 extracts bifurcation points and inflection points (FIG. 4(B)) from the blood vessel lines of the binarized blood vessel image (FIG. 4(A)).

Actually, the minutiae extraction section 31 performs a point extraction process, such as Harris Corner, to the binarized blood vessel image data DD supplied from the thin line section 22D (FIG. 2) to extract a plurality of bifurcation and inflection points from the blood vessel lines of the binarized blood vessel image of the binarized blood vessel image data DD.

The minutiae extraction section 31 supplies the bifurcation and inflection points to the minutiae connection section 32 as minutiae position data D31 while supplying the binarized blood vessel image data DD to the minutiae connection section 32.

In this embodiment, the minutiae extraction section 31 has set a threshold of curvature for a criterion function of determining whether each pixel is an inflection point or not (during the point extraction process) less than that of typical images such as landscape pictures. This allows extracting smoother minutia (bifurcation and inflection points) than typical images.

Accordingly, while the binarized blood vessel images have less bifurcation and inflection points than typical images, the minutiae extraction section 31 can extract more bifurcation and inflection points from the blood vessel lines of the binarized blood vessel images.

(2-2) Minutiae Connection Process (2-2-1) First Minutiae Connection Process

Figure 5:
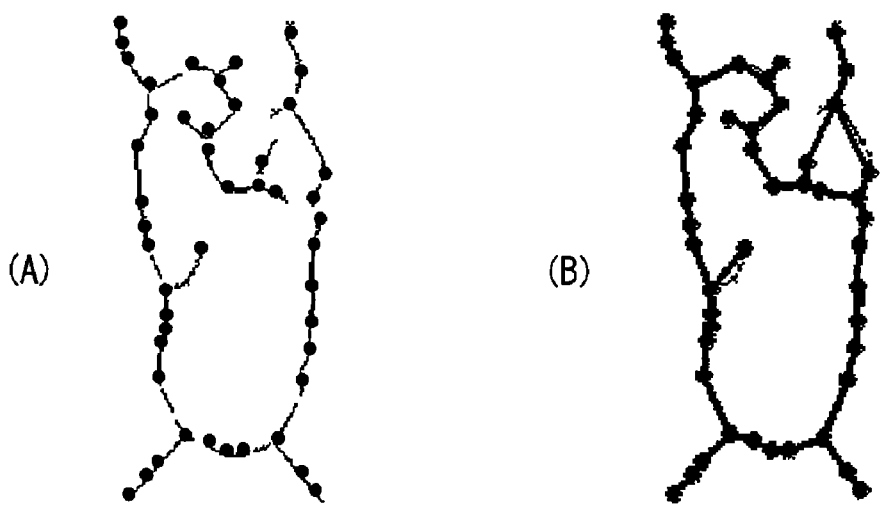
FIG. 5 is a schematic diagram before and after connection of the minutiae by a first minutiae connection process.

As shown in FIG. 5, the minutiae connection section 32 for example connects a plurality of bifurcation and inflection points on the blood vessel lines (FIG. 5(A)) to form approximate blood vessel lines (FIG. 5(B)).

In reality, after receiving the binarized blood vessel image data DD along with the minutiae position data D31 from the minutiae extraction section 31, the minutiae connection section 32 recognizes the bifurcation and inflection points from the binarized blood vessel image of the binarized blood vessel image data DD using the minutiae position data D31.

Figure 6:
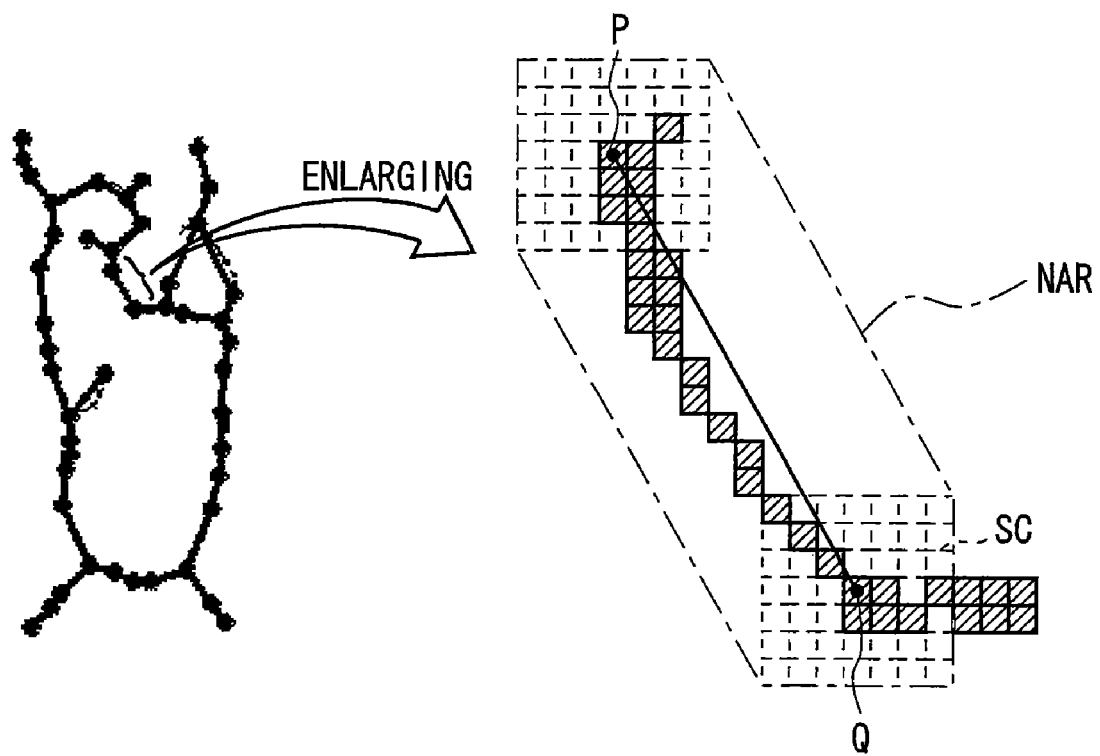
FIG. 6 is a schematic diagram illustrating the connection of minutiae by the first minutiae connection process.

As shown in FIG. 6, the minutiae connection section 32 then selects, out of those bifurcation and inflection points (minutiae), a minutia to be used as criteria for searching as a search criterion point P. The minutiae connection section 32 subsequently selects, other than the search criterion point P, any minutia as a search candidate point Q to form a segment (referred to as a "blood vessel correspondence segment") with the search criterion point P.

The minutiae connection section 32 detects pixels on the points P and Q and their surrounding pixels in areas SC: The areas SC are within n pixels from the points P and Q in both horizontal and vertical directions (n=3 in FIG. 6, for example). The minutiae connection section 32 then detects pixels (referred to as "blood vessel pixels") corresponding to the blood vessels from an adjacent area NAR (indicated by dotted lines in FIG. 6) between the areas SC. The minutiae connection section 32 subsequently counts the number of the blood vessel pixels, and then calculates a ratio of the number of blood vessel adjoining pixels to the length of the segment PQ.

If the ratio of the number of blood vessel adjoining pixels to the length of the segment PQ is greater or equal to a predetermined threshold, the minutiae connection section 32 determines that the search candidate point Q may be a part of the blood vessel correspondence segment including the search criterion point P. The minutiae connection section 32 therefore connects the search candidate point Q and the search criterion point P. The minutiae connection section 32 then selects a new minutia as the search candidate point Q and repeats the above search process.

Whereas if the ratio of the number of blood vessel adjoining pixels to the length of the segment PQ is less than the threshold, the minutiae connection section 32 determines that the search candidate point Q may not be a part of the blood vessel correspondence segment including the search criterion point P. The minutiae connection section 32 therefore does not connect the search candidate point Q and the search criterion point P. The minutiae connection section 32 then selects a new minutia as the search candidate point Q and repeats the above search process.

After completing the search process as a result of having selected all the minutiae as the search candidate point S, the minutiae connection section 32 chooses, instead of the current search criterion point P, a different minutia as the search criterion point Q, and keeps performing the above process to connect the bifurcation and inflection points (minutiae).

In this manner, the minutiae connection section 32 forms approximate blood-vessel lines by connecting the bifurcation and inflection points.

(2-2-2) Second Minutiae Connection Process

Instead of the first minutiae connection process, a second minutiae connection process described below may be adopted.

After receiving the binarized blood vessel image data DD along with the minutiae position data D31 from the minutiae extraction section 31, the minutiae connection section 32 recognizes the bifurcation and inflection points from the binarized blood vessel image of the binarized blood vessel image data DD using the minutiae position data D31.

Figure 7:
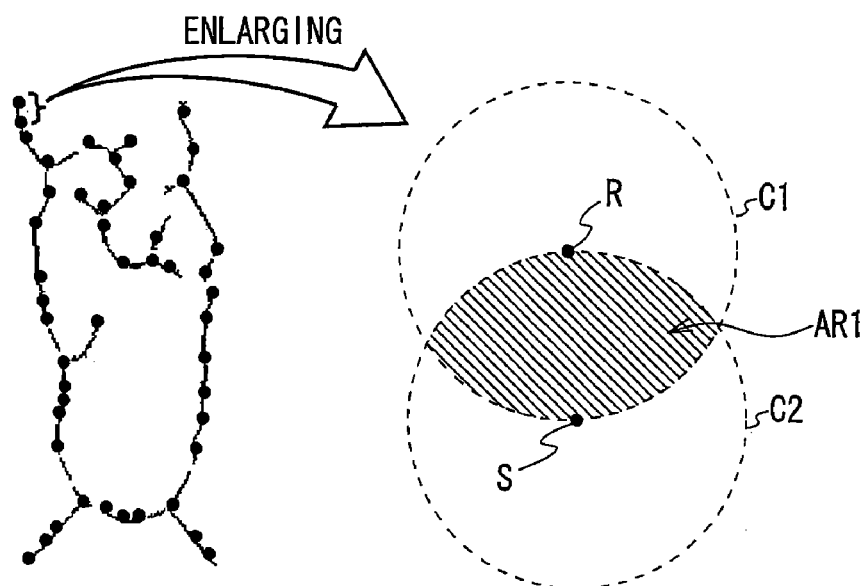
FIG. 7 is a schematic diagram illustrating the connection of minutiae by a second minutiae connection process.

As shown in FIG. 7, the minutiae connection section 32 then selects, out of those bifurcation and inflection points (minutiae), a minutia as a search criterion point R. The minutiae connection section 32 subsequently selects, other than the search criterion point R, any minutia as a search candidate point S to form a blood vessel correspondence segment with the search criterion point R.

The minutiae connection section 32 subsequently draws two circles C1 and C2 whose center points are respectively the search criterion point R and the search candidate point S and whose radii are the same length as the segment RS. The minutiae connection section 32 then finds out the bifurcation and inflection points, other than the search criterion point R and the search candidate point S, from an area (referred to as a "circle overlapping area") AR1 where the circles C1 and C2 overlap.

When the minutiae connection section 32 does not find other minutiae from the circle overlapping area AR1 the minutiae connection section 32 determines that the search candidate point S and the search criterion point R may form the blood vessel correspondence segment. The minutiae connection section 32 therefore connects the selected search candidate point S and search criterion point R. The minutiae connection section 32 then selects, instead of the current search candidate point S, a new minutia as the search candidate point S and repeats the above search process.

Whereas if the minutiae connection section 32 finds other minutiae from the circle overlapping area AR1 the minutiae connection section 32 determines that the search candidate point S and the search criterion point R may not form the blood vessel correspondence segment. The minutiae connection section 32 therefore does not connect the selected search candidate point S and search criterion point R. The minutiae connection section 32 then selects, instead of the current search candidate point S, a new minutia as the search candidate point S and repeats the above search process.

After completing the search process as a result of having selected all the minutiae as the search candidate point S, the minutiae connection section 32 chooses, instead of the current search criterion point R, a different minutia as the search criterion point R, and keeps performing the above process to connect the bifurcation and inflection points (minutiae).

In this manner, the minutiae connection section 32 forms approximate blood-vessel lines by connecting the bifurcation and inflection points.

Figure 8:
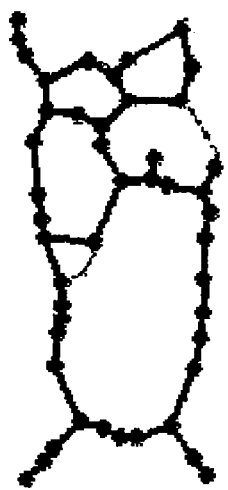
FIG. 8 is a schematic diagram illustrating a result of connecting the minutiae by the second minutiae connection process.

A difference between the first and second minutiae connection processes is this: While the second minutiae connection process connects minutiae based on the positions of the minutiae, the first minutiae connection process connects minutiae based on the state of the original image (or the number of the blood vessel pixels). FIG. 8 illustrates the result of the second minutiae connection process while FIG. 5(B) illustrates the result of the first minutiae connection process. It is evident that the second minutiae connection process eases calculation compared to the first minutiae connection process despite poorer accuracy. This level of accuracy, however, is enough for practical use as shown in FIG. 8 and FIG. 5A.

In addition to that, the minutiae connection section 32 appropriately deletes some of the connection parts (or the blood vessel correspondence segments) between the minutiae which are connected by the above first or second minutiae connection process to form the approximate blood vessel lines.

Figure 9:
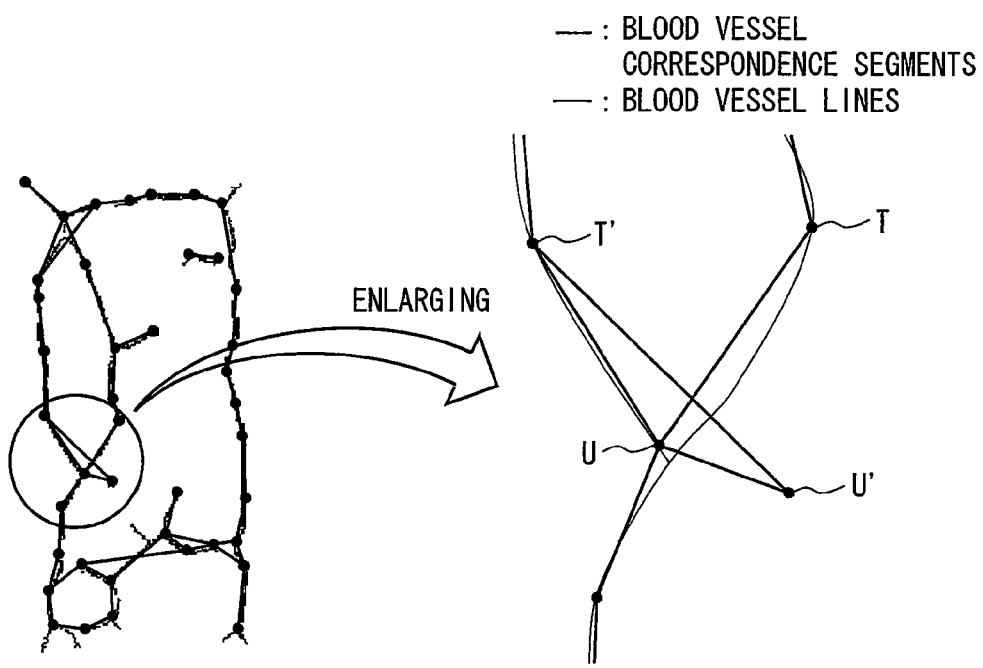
FIG. 9 is a schematic diagram illustrating deletion of connection portions (1)

In fact, the minutiae connection section 32 finds out, out of the connection parts (or the blood vessel correspondence segments) generated by connecting the minutiae to form the approximate blood vessel lines, the blood vessel correspondence segments crossing one another (referred to as "crossed blood vessel correspondence segments"). For example, when finding the crossed blood vessel correspondence segments TU and T'U' as shown in FIG. 9, the minutiae connection section 32 deletes the longer segment or the crossed blood vessel correspondence segment T'U'.

Figure 10:
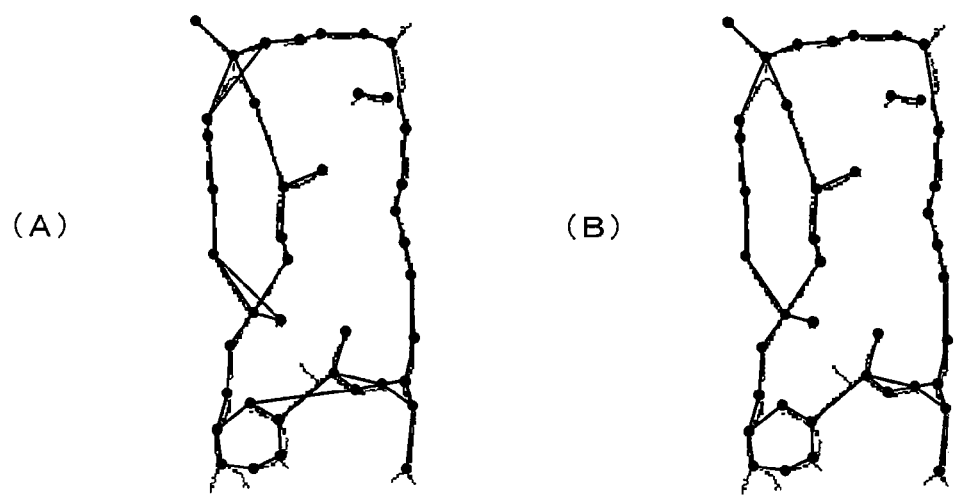
FIG. 10 is a schematic diagram illustrating before and after deletion (1)

FIG. 10(A) illustrates the lines before deletion while FIG. 10(B) shows those after deletion: The connected bifurcation and inflection points illustrated by FIG. 10(B) seem to depict the blood vessel lines more precisely than those of FIG. 10(A).

After completing the search for the crossed blood vessel correspondence segments, the minutiae connection section 32 finds out, out of the connection parts (or the blood vessel correspondence segments) generated by connecting the minutiae to form the approximate blood vessel lines, a group of blood vessel correspondence segments (referred to as "triangle-forming blood vessel correspondence segments") locally forming a triangle.

Figure 11:
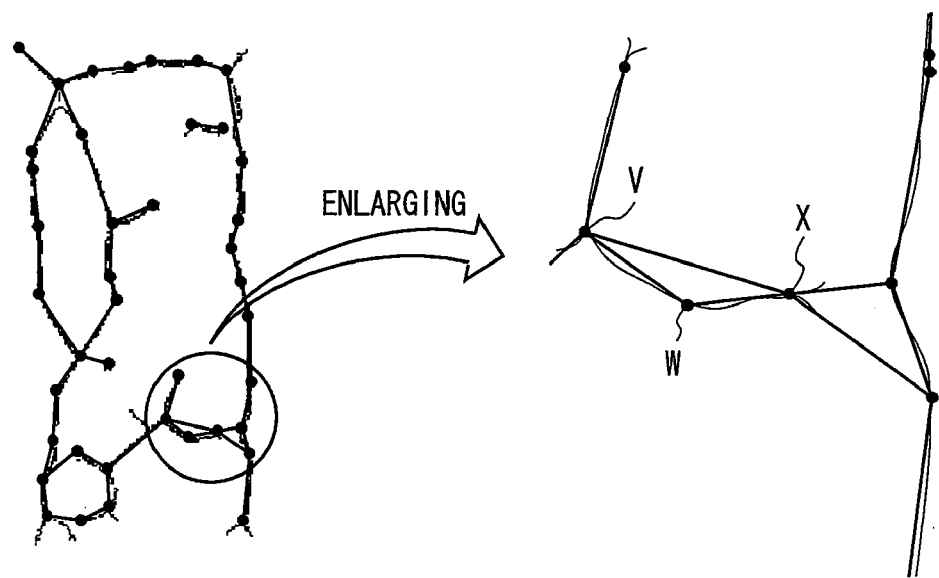
FIG. 11 is a schematic diagram illustrating deletion of connection portions (2)

If the minutiae connection section 32 finds out the triangle-forming blood vessel correspondence segments VW, WX and VX as shown in FIG. 11, the minutiae connection section 32 calculates the area of that triangle. If the calculated are is greater than a threshold, the minutiae connection section 32 deletes, out of the triangle-forming blood vessel correspondence segments VW, WX and VX, the longer triangle-forming blood vessel correspondence segment VX.

Figure 12:
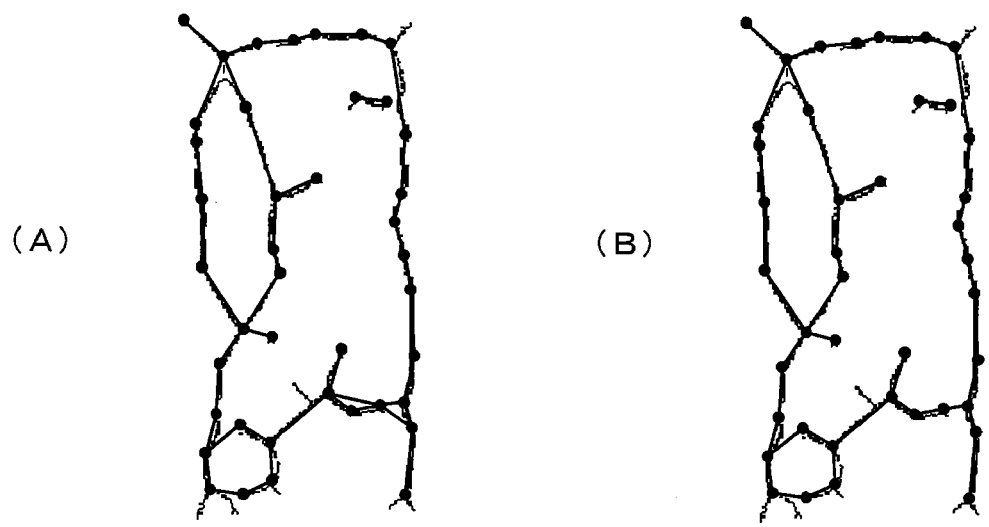
FIG. 12 is a schematic diagram illustrating before and after deletion (2)

FIG. 12(A) illustrates the lines before deletion while FIG. 12(B) shows those after deletion: The connected bifurcation and inflection points illustrated by FIG. 12(B) seem to depict the blood vessel lines more precisely than those of FIG. 12(A).

In this manner, the minutiae connection section 32 appropriately deletes some of the blood vessel correspondence segments generated by connecting the minutiae to form the approximate blood vessel lines.

The minutiae connection section 32 subsequently generates data (referred to as "connection state data") illustrating the connection state of the minutiae that corresponds to the remaining connection points (or the remaining blood vessel correspondence segments. The minutiae connection section 32 then registers the connection state data and the binarized blood vessel image data DD in the flash memory FM as the registration authentication information RC: The binarized blood vessel image data DD illustrates the plurality of minutiae on the blood vessel lines (FIG. 12(B)).

Since the minutiae connection section 32 appropriately deletes some of the connected parts generated by connecting the minutiae to form the approximate blood vessel lines, the connection state of minutiae illustrated by the registration authentication information RC stored in the flash memory FM is more accurate.

(2-3) Blood Vessel Reconfiguration Process

The blood vessel reconfiguration section 33 reproduces, based on the registration authentication information RC depicting both the plurality of minutiae and their connection state, the blood vessel lines corresponding to the blood vessel lines (FIG. 12(B)) on the original binarized blood vessel image.

In reality, the blood vessel reconfiguration section 33 recognizes, based on the connection state data of the registration authentication information RC that the control section 20 (FIG. 2) read out from the flash memory FM, the connection state of the minutiae indicated by the minutiae position data of the registration authentication information RC.

Based on the recognition result, the blood vessel reconfiguration section 33 performs a line drawing process based on an algorithm such as Bresenham to select minutiae to form a segment. This reproduces the blood vessel lines corresponding to the blood vessel lines (FIG. 12(B)) on the original binarized blood vessel image.

The blood vessel reconfiguration section 33 subsequently generates data (referred to as "reconfigured binarized blood vessel image data") D33 of a binarized blood vessel image (or reconfigured binarized blood vessel image) depicting the reproduced blood vessel lines, and supplies it to the checkup section 34.

(2-4) Checkup Process

The checkup section 34 identifies a person using a blood vessel formation pattern on the reconfigured binarized blood vessel image and a blood vessel formation pattern of the binarized blood vessel image obtained as a result of shooting the person's finger.

In reality, the checkup section 34 calculates the correlation between the reconfigured binarized blood vessel image of the reconfigured binarized blood vessel image data D33 supplied from the blood vessel reconfiguration section 33 and the binarized blood vessel image of the binarized blood vessel image data DD supplied from the thin line section 22D (FIG. 3). In this manner, the checkup section 34 compares the blood vessel formation patterns on the binarized blood vessel images.

If the calculated correlation is less or equal to a predetermined threshold, the checkup section 34 determines that the person, whose image has been shot by the blood vessel image pickup section 2, is not the one registered. Whereas if the calculated correlation is greater than the threshold, the checkup section 34 determines that the person is the one registered. The checkup section 34 under the control of the control section 20 notifies the external devices of the determination result by transmitting determination data D1 through the external interface IF.

(3) Operation and Effect

The authentication device 1 with the above configuration extracts, based on the blood vessel image signal SA obtained as a result of shooting the blood vessels inside the living body for an authentication target of unique living-body parts, the plurality of minutiae from the blood vessel lines of the blood vessel image (FIG. 5A), and connects those minutiae to form the approximate blood vessel lines (FIG. 5(B)).

The authentication device 1 subsequently stores the following data in the flash memory FM as the registration authentication information RC: the connection state data illustrating the connection state of the connected minutiae; and the minutiae position data depicting the positions of the minutiae. When performing authentication, the authentication device 1 reproduces, based on the registration authentication information RC in the flash memory FM, the blood vessel lines to be compared with the other images.

Accordingly, before or after performing authentication, the flash memory FM of the authentication device 1 has only recorded the information of the minutiae and the information of the connection state of the reliable minutiae that approximate to the authentication information. This reduces the amount of the registration authentication information RC stored in the flash memory FM, and therefore improves efficiency in use of the flash memory FM while maintaining the accuracy of authentication.

In addition, the authentication device 1, when connecting the minutiae to form the approximate blood vessel lines, deletes: the longer one out of the connection parts being crossed each other (or the crossed blood vessel correspondence segment T'U' (FIG. 9)); and the longer one out of the connection parts that form a shape of triangle (or the triangle-forming blood vessel correspondence segment VX (FIG. 11)). The authentication device 1 subsequently registers the connection state data indicating the connection state of the remaining minutiae as the registration authentication information RC.

In this manner, the authentication device 1 stores only the information indicating the connection state of reliable minutiae as the authentication information along with the plurality of minutiae. This maintains the accuracy of authentication while improving efficiency in the use of the flash memory FM.

According to the above configuration, the authentication device 1 extracts, based on the blood vessel image obtained by taking a picture of the blood vessels inside the living body as the authentication target unique to the living body, the plurality of minutiae from the blood vessel lines. The authentication device 1 then connects the minutiae to form the approximate blood vessel lines. The authentication device 1 subsequently stores, along with the information indicating the minutiae, the information indicating the connection state of the connected minutiae in the flash memory FM as the registration authentication information RC. When performing authentication, the authentication device 1 reproduces, based on the registration authentication information RC in the flash memory FM, the blood vessel lines to be compared with the other. This reduces the amount of the registration authentication information RC to be stored in the flash memory FM, and therefore improves efficiency in the use of the flash memory FM while maintaining the accuracy of authentication.

(4) Other Embodiment

In the above-noted embodiment, the blood vessels inside the finger FG are applied as the authentication target unique to the living body. However the present invention is not limited to this. Other blood vessels may be applied: the blood vessels in palms, arms, eyes or other body parts. Alternatively, the following may be applied: fingerprints on the surface of living body, a pattern of papers, nerves inside the living body, or the like. In the case of using the nerves for authentication, a marker specific to the nerves may be injected into the living body for taking a picture of the marker. This allows the nerves to be the authentication target like the above-noted embodiment.

Moreover, in the above-noted embodiment, as extraction means to extract a plurality of points from the authentication target based on the image obtained by taking a picture of the authentication target unique to the living body, the processes of the A/D converter 22A (FIG. 3), the filter section 22B (FIG. 3), the binarization section 22C and the thin line section 22D are applied to extract the minutiae from the blood vessel image signal SA. However the present invention is not limited to this. Those processes may vary according to need.

Furthermore, as the minutiae, the bifurcation and inflection points are extracted by a point extraction process (Harris Corner) from the blood vessel lines on the binarized blood vessel image. However the present invention is not limited to this. Any points may be extracted from the blood vessel lines on the binarized blood vessel image: a predetermined size of a lattice-pattern image may be put on the binarized blood vessel image to extract points from the blood vessel lines being overlapped with the lattice pattern. This has the same effect as the above-noted embodiments.

Figure 13:
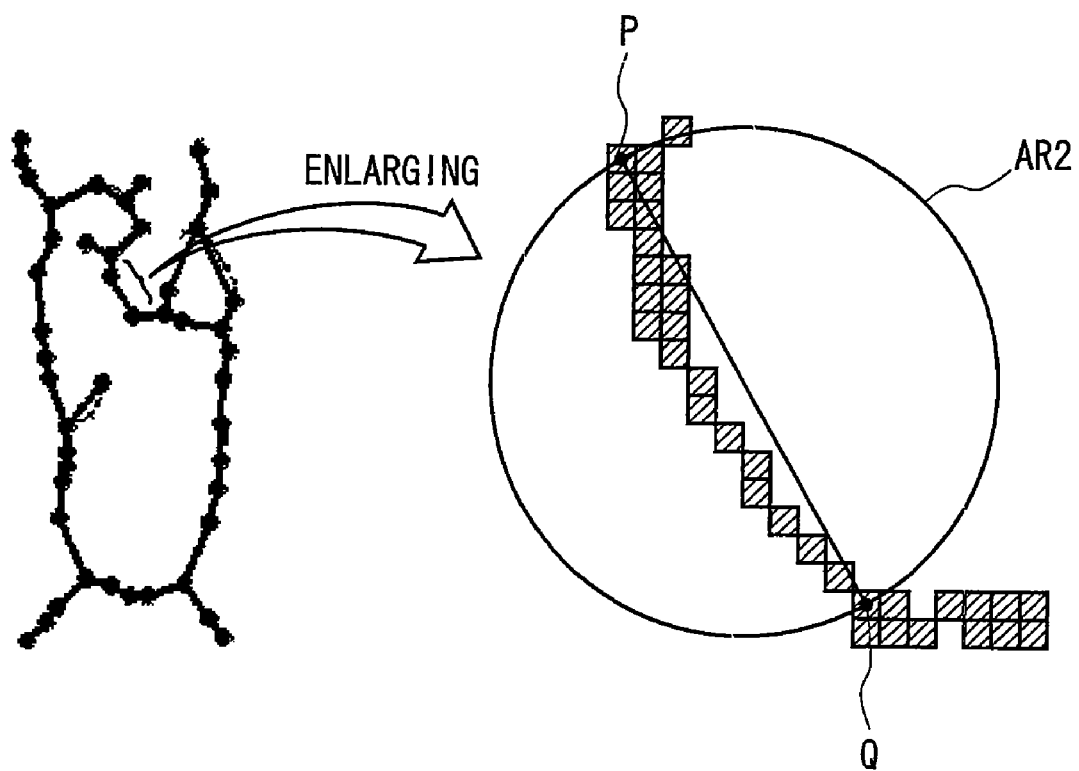
FIG. 13 is a schematic diagram illustrating connection of minutiae according to another embodiment of the present invention.

Furthermore, in the above-noted embodiments, as connection means to connect the points extracted by the extraction means, the first and second minutiae connection processes (FIGS. 6 and 7) are applied: the first minutiae connection process connects the minutiae in accordance with the ratio of the number of the blood vessel pixels that exist in the area NAR adjacent to the segment PQ to the length of the segment PQ while the second minutiae connection process connects the minutiae after examining whether points other than R and S exist in the circle overlapping area AR where the circles C1 and C2 (whose radii are the same length as the segment RS and whose centers are respectively R and S) overlap each other. However the present invention is not limited to this. Other methods may be applies, such as connecting the minutiae in accordance with the number of blood vessel pixels inside an circle are AR2 whose diameter is the same length as the segment as shown in FIG. 13.

Furthermore, in the above-noted embodiment, as correction means to correct the minutiae being connected by the connection means, the following process is applied: deleting the longer one out of the connection parts being crossed each other (or the crossed blood vessel correspondence segment T'U' (FIG. 9)); and then deleting the longer one out of the connection parts that form a shape of triangle (or the triangle-forming blood vessel correspondence segment VX (FIG. 11)). However the present invention is not limited to this. After deleting the triangle-forming blood vessel correspondence segment VX, the crossed blood vessel correspondence segment T'U' may be deleted.

Alternatively, in a similar way to that of FIG. 6, after counting the number of blood vessel pixels inside an area adjacent to the crossed blood vessel correspondence segment TU and T'U' or the triangle-forming blood vessel correspondence segments VW, WX and VX, the crossed blood vessel correspondence segment TU and T'U' and the triangle-forming blood vessel correspondence segments VW, WX and VX may be deleted in accordance with the result of the counting. This forms more precise blood vessel lines because the blood vessel correspondence segments TU, T'U', VW, WX and VX are left in accordance with the real blood vessels.

By the way, in the case of connecting the points in accordance with the number of blood vessel pixels inside the circle area AR2 whose diameter is the same length as the segment, instead of the correction method that deletes the crossed blood vessel correspondence segment T'U' (FIG. 9) and triangle-forming blood vessel correspondence segment VX, the blood vessel correspondence segments TU, T'U', VW, WX and VX may be deleted in accordance with a ratio of the number of the blood vessel pixels adjacent to the segments TU, T'U', VW, WX and VX to those lengths.

In addition, in the above-noted embodiments, as a timing of correction, after connecting all the minutiae to form the approximate blood vessel lines, the connection portions are corrected. However the present invention is not limited to this. Every time the search criterion points P (FIG. 6) and R (FIG. 7) and the search candidate points Q (FIG. 6) and S (FIG. 7) are connected, the connection portions may be corrected.

Furthermore, as storage means to store the information indicating the connection state of the minutiae and the information indicating the minutiae as the authentication information, the flash memory FM is applied. However the present invention is not limited to this. Other storage means can be applied, such as HDD (Hard Disk Drive) and a removable "MEMORY STICK (Registered Trademark of Sony Corporation)".

In addition, the storage means may be not integrated with the authentication device 1: The storage means may be connected to the authentication device 1 through a transmission line.

Furthermore, in the above-noted embodiment, as reproduction means to reproduce, based on the authentication information in the storage means, the authentication target to be compared with the other, a line drawing process based on an algorithm such as Bresenham is applied. However the present invention is not limited to this. Other line drawing processes may be applied.

INDUSTRIAL APPLICABILITY

The present invention can be used in the field of biometric identification.

The invention claimed is:

1. An authentication apparatus comprising:
extraction means that extracts a plurality of points on an authentication target from an image obtained by shooting the authentication target unique to a living body;
connection means that connects the points extracted by the extraction means such that the points approximate to the authentication target;
storage means that stores information indicating a connection state of the points being connected by the connection means and information indicating the points as authentication information;
reproduction means that reproduces, based on the authentication information in the storage means, the authentication target to be compared with the other; and
correction means that corrects the points being connected by the connection means,
wherein,
the storage means stores the information indicating the connection state of the points after being corrected by the correction means and the information indicating the points as the authentication information, and
the correction means corrects the points whose segments are overlapped with one another and the points whose segments form a shape of a triangle.

2. The authentication apparatus according to claim 1, wherein the connection means connects the points extracted by the extraction means in accordance with a ratio of the number of the authentication target's pixels adjacent to a segment between the points to the length of the segment.

3. The authentication apparatus according to claim 1, wherein the correction means corrects the points whose segments are overlapped with one another.

4. The authentication apparatus according to claim 1, wherein the correction means corrects the points whose segment is longest among the segments being overlapped with one another and the points whose segment is longest among the segments forming a shape of a triangle.

5. An authentication method comprising:
a first step of extracting a plurality of points on an authentication target from an image obtained by shooting the authentication target unique to a living body;
a second step of connecting the points extracted such that the points approximate to the authentication target;
a third step of storing information indicating a connection state of the points being connected and information indicating the points in storage means as authentication information; and
a fourth step of reproducing, based on the authentication information in the storage means, the authentication target to be compared with the other,
wherein,
the second step includes a correction step of correcting the connected points,
the third step stores the information indicating the connection state of the points after being corrected and the information indicating the points as the authentication information
the correction step corrects the points whose segments are overlapped with one another and the points whose segments form a shape of a triangle, and
the correction step corrects the points whose segment is longest among the segments being overlapped with one another and the points whose segment is longest among the segments forming a shape of a triangle.

6. The authentication method according to claim 5, wherein
the second step connects the extracted points in accordance with a ratio of the number of the authentication target's pixels adjacent to a segment between the points to the length of the segment.

7. The authentication method according to claim 5, wherein the correction step corrects the points whose segments are overlapped with one another.

8. The authentication method according to claim 5, wherein the correction step corrects the points whose segment is longest among the segments being overlapped with one another and the points whose segment is longest among the segments forming a shape of a triangle.

9. A computer-readable medium having stored thereon a program for causing an apparatus to execute:

a first process of extracting a plurality of points on an authentication target from an image obtained by shooting the authentication target unique to a living body;

a second process of connecting the points extracted such that the points approximate to the authentication target;

a third process of storing information indicating a connection state of the points being connected and information indicating the points in storage means as authentication information; and a fourth process of reproducing, based on the authentication information in the storage means, the authentication target to be compared with the other, wherein, the second process includes a correction process of correcting the connected points, the third process stores the information indicating the connection state of the points after being corrected and the information indicating the points as the authentication information and the correction process corrects the points whose segments are overlapped with one another and the points whose segments form a shape of a triangle.

10. The computer-readable storage medium according to claim 9, wherein the second process connects the extracted points in accordance with a ratio of the number of the authentication target's pixels adjacent to a segment between the points to the length of the segment.

11. The computer-readable storage medium according to claim 9, wherein the correction process corrects the points whose segments are overlapped with one another.

12. The computer-readable storage medium according to claim 9, wherein the correction process corrects the points whose segment is longest among the segments being overlapped with one another and the points whose segment is longest among the segments forming a shape of a triangle.

* * * * *